(12) United States Patent
Ren et al.

(10) Patent No.: US 12,530,878 B2
(45) Date of Patent: Jan. 20, 2026

(54) SEQUENCE PROCESSING FOR A DATASET WITH FRAME DROPPING

(71) Applicant: QUALCOMM Incorporated, San Diego, CA (US)

(72) Inventors: Yuwei Ren, Beijing (CN); Yin Huang, Beijing (CN); Chirag Sureshbhai Patel, San Diego, CA (US); Jiuyuan Lu, Beijing (CN); Hao Xu, Beijing (CN); Andrian Beletchi, Beijing (CN)

(73) Assignee: Qualcomm Incorporated, San Diego, CA (US)

(*) Notice: Subject to any disclaimer, the term of this patent is extended or adjusted under 35 U.S.C. 154(b) by 318 days.

(21) Appl. No.: 18/033,305

(22) PCT Filed: Dec. 15, 2021

(86) PCT No.: PCT/CN2021/138300
§ 371 (c)(1),
(2) Date: Apr. 21, 2023

(87) PCT Pub. No.: WO2022/127819
PCT Pub. Date: Jun. 23, 2022

(65) Prior Publication Data
US 2024/0013521 A1 Jan. 11, 2024

(30) Foreign Application Priority Data
Dec. 15, 2020 (WO) ................ PCT/CN2020/136479

(51) Int. Cl.
*G06V 10/00* (2022.01)
*G01S 7/41* (2006.01)
(Continued)

(52) U.S. Cl.
CPC ............ *G06V 10/776* (2022.01); *G01S 7/415* (2013.01); *G01S 7/417* (2013.01); *G06V 10/431* (2022.01);
(Continued)

(58) Field of Classification Search
CPC ...... G06V 10/40; G06V 10/764; G06V 10/82; G06V 10/776; G06V 10/431;
(Continued)

(56) References Cited

U.S. PATENT DOCUMENTS 10,511,908 B1    12/2019   Fisher
10,614,827 B1    4/2020   Korjani
(Continued)

FOREIGN PATENT DOCUMENTS

CN    104089699 A    10/2014
CN    104834922 A    8/2015
(Continued)

OTHER PUBLICATIONS

Supplementary European Search Report—EP21905746—Search Authority—Munich—Sep. 26, 2024.
(Continued)

*Primary Examiner* — Amir Alavi
(74) *Attorney, Agent, or Firm* — Seyfarth Shaw LLP

(57) ABSTRACT

A computer-implemented method for restoring a sequence for a dataset with frame dropping includes receiving an input sequence. A set of features is extracted from the input sequence. A frequency distribution is determined for the input sequence based on the extracted features. Time domain information for the sequence is restored and in turn, data for the input sequence is augmented based on the restored time domain information. Additionally, noise is removed from the input sequence.

8 Claims, 17 Drawing Sheets

(51) Int. Cl.
*G06V 10/42* (2022.01)
*G06V 10/764* (2022.01)
*G06V 10/77* (2022.01)
*G06V 10/776* (2022.01)
*G06V 10/82* (2022.01)
*G06V 40/20* (2022.01)

(52) U.S. Cl.
CPC ........ *G06V 10/764* (2022.01); *G06V 10/7715* (2022.01); *G06V 10/82* (2022.01); *G06V 40/28* (2022.01)

(58) Field of Classification Search
CPC .... G06V 10/7715; G06V 40/28; G06F 3/017; G01S 13/582; G01S 13/584; G01S 13/88; G01S 7/417; G06N 3/045; G06N 3/08
See application file for complete search history.

(56) References Cited

U.S. PATENT DOCUMENTS

| | | | | |
|---|---|---|---|---|
| 10,817,712 | B2* | 10/2020 | Tai | G06V 40/20 |
| 11,727,596 | B1* | 8/2023 | Gafni | G06T 7/20 382/291 |
| 11,822,887 | B2* | 11/2023 | Wang | G06F 40/295 |
| 11,886,645 | B2* | 1/2024 | Risco | G06N 3/08 |
| 11,948,378 | B2* | 4/2024 | Dey | G06V 10/82 |
| 12,125,247 | B2* | 10/2024 | Houlsby | G06T 7/97 |
| 2012/0068768 | A1* | 3/2012 | Ishikawa | H03F 3/189 330/149 |
| 2017/0178343 | A1* | 6/2017 | Maranatha | G06V 20/46 |
| 2019/0087009 | A1 | 3/2019 | Rao et al. | |
| 2020/0105287 | A1 | 4/2020 | Chang et al. | |
| 2024/0013521 | A1* | 1/2024 | Ren | G06V 10/82 |

FOREIGN PATENT DOCUMENTS

| | | |
|---|---|---|
| CN | 106023996 A | 10/2016 |
| CN | 111081268 A | 4/2020 |
| WO | 2020143032 A1 | 7/2020 |

OTHER PUBLICATIONS

International Search Report and Written Opinion—PCT/CN2020/136479—ISA/EPO—Sep. 14, 2021.
International Search Report and Written Opinion—PCT/CN2021/138300—ISA/EPO—Mar. 10, 2022.
Hazra S., et al., "Short-Range Radar-Based Gesture Recognition System Using 3D CNN With Triplet Loss", IEEE Access, vol. 7, pp. 125623-125633, Aug. 30, 2019.
Wang Y., et al., "TS-I3D Based Hand Gesture Recognition Method With Radar Sensor", IEEE Access, vol. 7, pp. 22902-22913, Feb. 4, 2019.

* cited by examiner

SEQUENCE PROCESSING FOR A DATASET WITH FRAME DROPPING

CROSS-REFERENCE TO RELATED APPLICATION

The present application claims the benefit of International Patent Application No. PCT/CN2020/136479, filed on Dec. 15, 2020, and titled "SEQUENCE PROCESSING FOR A DATASET WITH FRAME DROPPING," the disclosure of which is expressly incorporated by reference in its entirety.

FIELD OF DISCLOSURE

Aspects of the present disclosure generally relate to sequence restoration, data augmentation, and sequence segmentation for datasets with frame dropping.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Recent developments in antenna and processing technologies have allowed for the integration of radar systems into mobile/handheld devices. There has been exploration of using radar for gesture recognition, which provides various benefits compared to appearance-based recognition systems, such as standard video. For example, radar sensing can work well regardless of light conditions with limited power consumption. Also, radar sensing is not affected by skin color and other static information and is thus less likely to over-fit certain genders and races. Radar sensing technology is in its infancy, however, and improvements would provide a better user experience.

SUMMARY

In an aspect of the present disclosure, a computer-implemented method for restoring a sequence is provided. The method includes receiving an input sequence. The method also includes extracting a set of features from the input sequence. Additionally, the method includes determining a frequency distribution for the input sequence based on the extracted features. The method further includes restoring time domain information for the input sequence by performing an inverse fast Fourier transformation on the frequency distribution. The method augments data for the input sequence by decoding the restored time domain information, and classifies the input sequence based on the augmented data.

In another aspect of the present disclosure, a computer-implemented method for processing a sequence is provided. The method includes receiving a sequence including one or more motion portions and one or more noise portions. The method also includes extracting features representing the sequence. Additionally, the method includes identifying one or more of the noise portions via an artificial neural network (ANN). The ANN is trained to identify noise based on the extracted features. Further, the method includes removing the identified noise portions of the sequence.

In another aspect of the present disclosure, an apparatus for restoring a sequence is provided. The apparatus includes a memory and one or more processors coupled to the memory. The processor(s) are configured to receive an input sequence. The processor(s) are also configured to extract a set of features from the input sequence. In addition, the processor(s) are configured to determine a frequency distribution for the input sequence based on the extracted features. The processor(s) are further configured to restore time domain information for the input sequence by performing an inverse fast Fourier transformation on the frequency distribution. Further, the processor(s) are configured to augment data for the input sequence by decoding the restored time domain information, and to classify the input sequence based on the augmented data.

In another aspect of the present disclosure, an apparatus for processing a sequence is provided. The apparatus includes a memory and one or more processors coupled to the memory. The processor(s) are configured to receive a sequence including one or more motion portions and one or more noise portions. The processor(s) are also configured to extract features representing the sequence. In addition, the processor(s) are configured to identify one or more of the noise portions via an artificial neural network (ANN). The ANN is trained to identify noise based on the extracted features. Further, the processor(s) are configured to remove the identified noise portions of the sequence.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 10A-1 and 10A-2 show a sequence of range-Doppler images (RDIs) corresponding to a swipe left gesture and a logging procedure, in accordance with aspects of the present disclosure.

DETAILED DESCRIPTION

Figure 1:
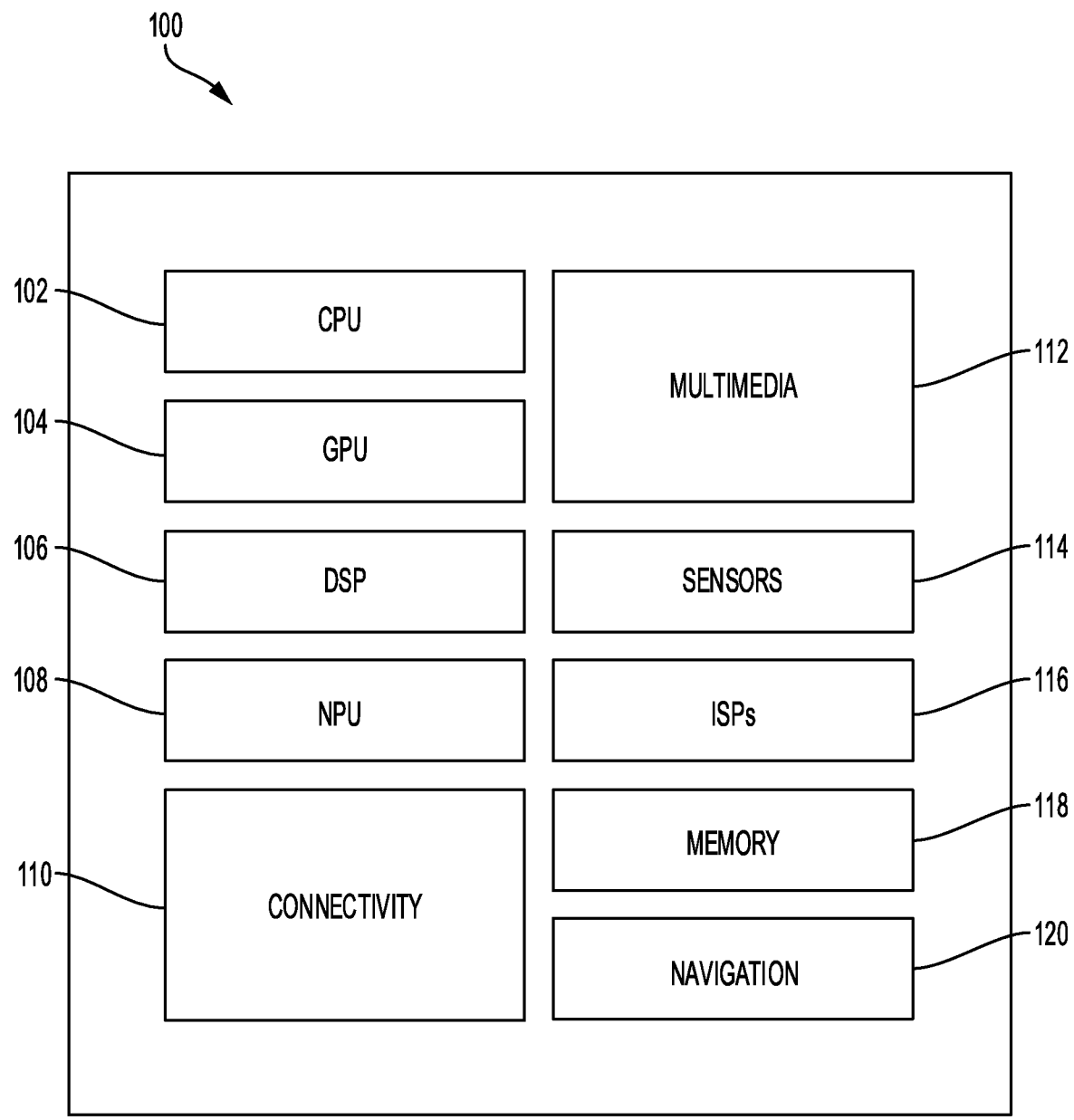
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described above, recent developments in antenna and processing technologies have allowed for the integration of radar systems into mobile/handheld devices. For example, mobile phones may use a dedicated radar device to classify a gesture. Additionally, series radar short range devices may provide for in-car-based control.

Radio frequency (RF) sensing may be used to image the environment, based on information such as range, Doppler, and angle information. A higher frequency, larger bandwidth, compact array may achieve a greater granularity, applicable for a mobile device or an access point (AP) for sensing.

Solutions for radar devices may be based on a deep learning pipeline to make the analyses. The captured data may be processed to a range-Doppler image, with range and Doppler speed estimation (as described later with respect to FIGS. 9A-C). Other features from the captured data may include angle information, signal strength variation, and others. Solutions may also be based on conventional methods, such as a support-vector machine (SVM) or decision tree, however, the performance is not as good with the deep learning methods.

A radar device may be configured in several ways. For example, in a first optional configuration, the radar device may be a millimeter wave (mmWave)-based dedicated radar with a frequency-modulated continuous wave (FMCW) waveform. In a second optional configuration, the radar device may be an mmWave-based Wi-Fi chip, with a pulse-based radar. In a third optional configuration, the antennas may be configured in the front or two sides of the radar device.

One challenge presented by range-Doppler images (RDIs) is that the dataset is limited. For example, features in the RDI may be considered as a one channel image. Also, the detected target may be a highlighted pixel. The dataset is also limited in that the x-dimension and y-dimension may be mapped to the Doppler speed and range index, and the shape of the set of the highlighted pixels may correspond to the speed and range variation in the measured frame duration. The RDI is different from a camera-based picture, as there are not any other available images with the RDI. Accordingly, most traditional methods for data augmentation are not available for the radar features. The radar device configuration may have different features, so other captured data may not be easily used to enlarge the data set. It may also be different with configurations for different antenna beams.

A second challenge presented by RDIs is that RDI involves random frame dropping in the captured sequence. That is, sensors usually capture the data sample-by-sample as one sequence, for example, with index 0,1,2,3 . . . , etc. Hardware constraints (e.g., limited computation capability, and limited power or buffer size) may lead to random frame dropping, which destroys the sequence order information. Accordingly, aspects of the present disclosure are directed to restoring a full input sequence. In some aspects, the sequence order may also be restored.

A third challenge presented by the captured RDI sequence is that RDI sequences mix noise portions and target motion portions. Additionally, the target motion portions are difficult to identify in the mixed sequence, because noise portions in the RDI show similar characteristics to those of the target motion, and conventional vision-based solutions are not applicable. Accordingly, in some aspects, noise portions of the input sequence may be predicted, identified, and removed to produce a sequence including a reduced number of noise portions. In some aspects, the resulting sequence may include only the target motion portions (e.g., pure portions).

FIG. 1 illustrates an example implementation of a system-on-a-chip (SOC) 100, which may include a central processing unit (CPU) 102 or a multi-core CPU configured for sequence restoration and data augmentation for datasets with frame dropping. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system. In one example, sensor processor 114 may be configured to process radio frequency signal or radar signals. For instance, the sensor processor 114 may be configured to receive mmWave, frequency modulated continuous wave (FMCW), pulse-based radar, or the like.

The SOC 100 may be based on an ARM instruction set. In an aspect of the present disclosure, the instructions loaded into the general-purpose processor 102 may include code to receive an input sequence. The general-purpose processor 102 may also include code to extract a set of features from the input sequence. The general-purpose processor 102 may also include code to determine a frequency distribution for the input sequence based on the extracted features. The general-purpose processor 102 may further include code to restore time domain information for the sequence by performing an inverse fast Fourier transformation on the frequency distribution. Furthermore, the general-purpose processor 102 includes code to augment data of the input sequence by decoding the restored time domain information, and classifying the input sequence based on the augmented data.

In another aspect of the present disclosure, the instructions loaded into the general-purpose processor 102 may include code to receive a sequence including one or more motion portions and one or more noise portions. The general-purpose processor 102 may also include code to extract features representing the sequence. The general-purpose processor 102 may include code to identify one or more of the noise portions via an artificial neural network (ANN). The ANN is trained to identify noise based on the extracted features. The general-purpose processor 102 may further include code to remove the identified noise portions of the sequence.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
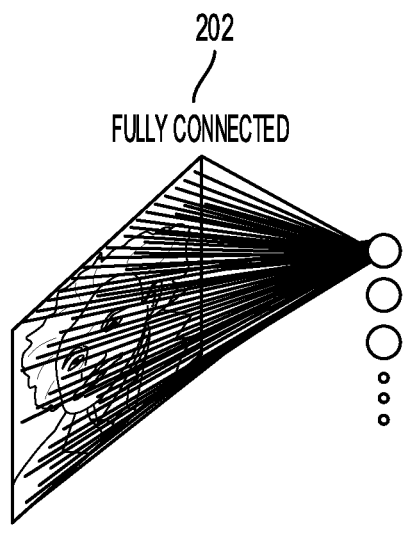
FIGS. 2A, 2B, and 2C are diagrams illustrating a neural network in accordance with aspects of the present disclosure.
Figure 2B:
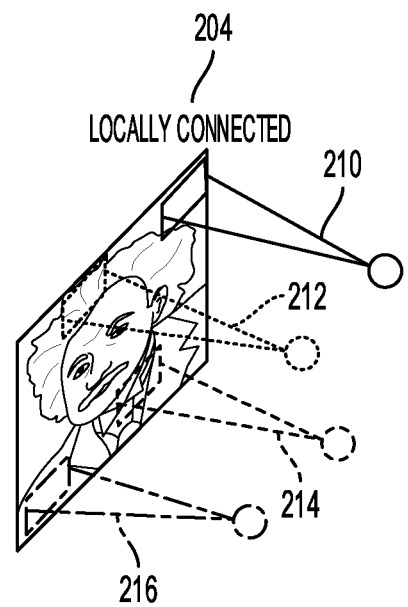

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
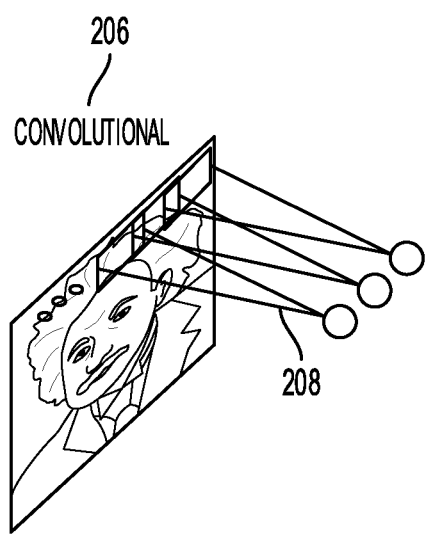

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
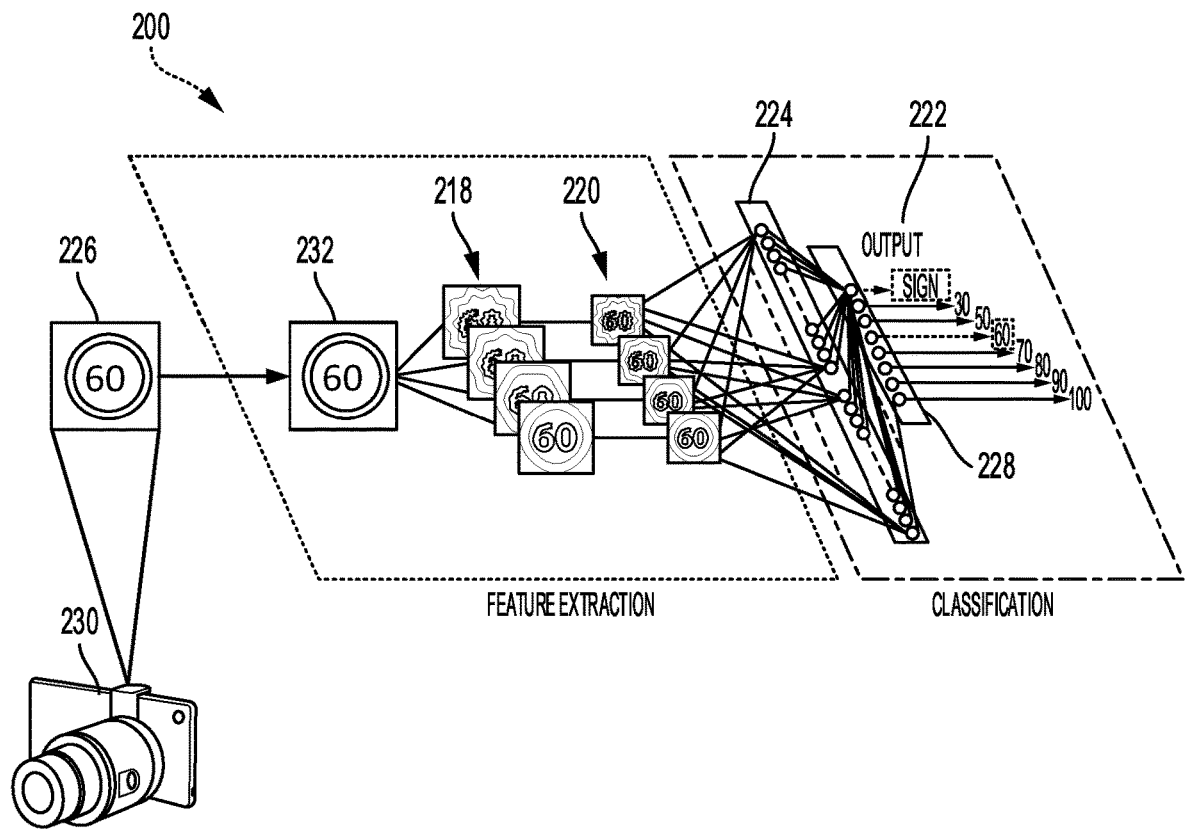
FIG. 2D is a diagram illustrating an exemplary deep convolutional network (DCN) in accordance with aspects of the present disclosure.

One type of convolutional neural network is a deep convolutional neural network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
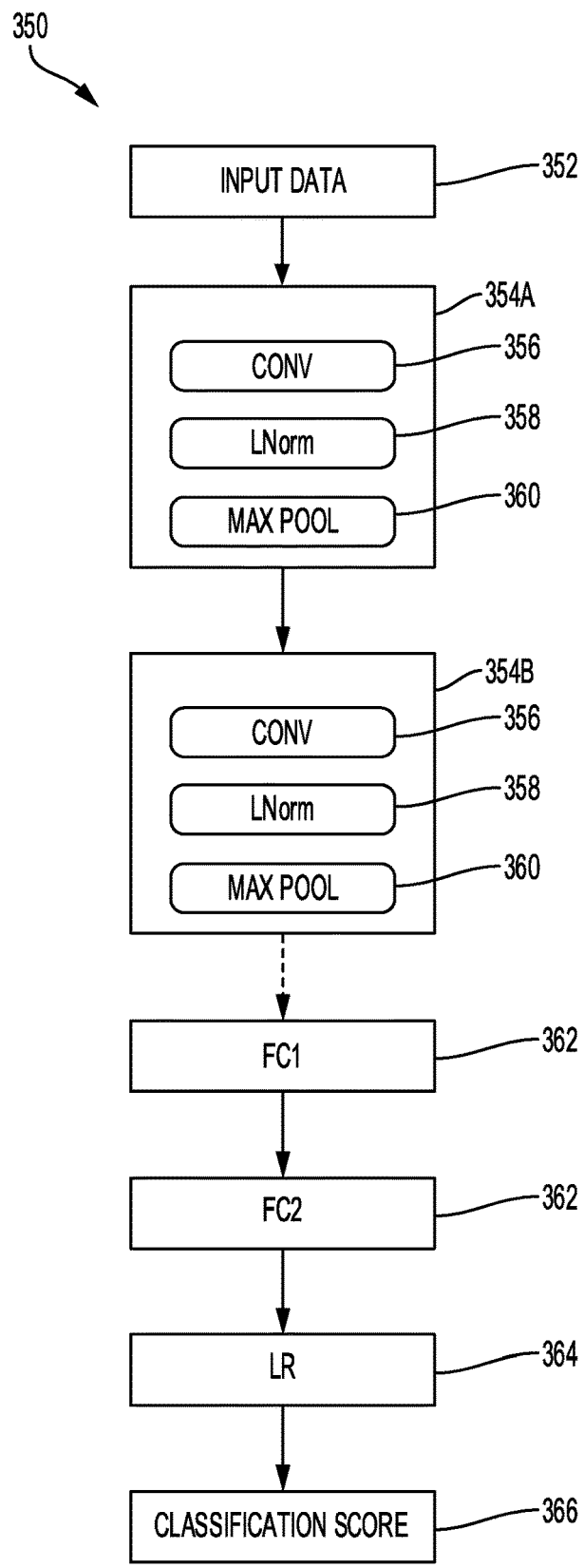
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
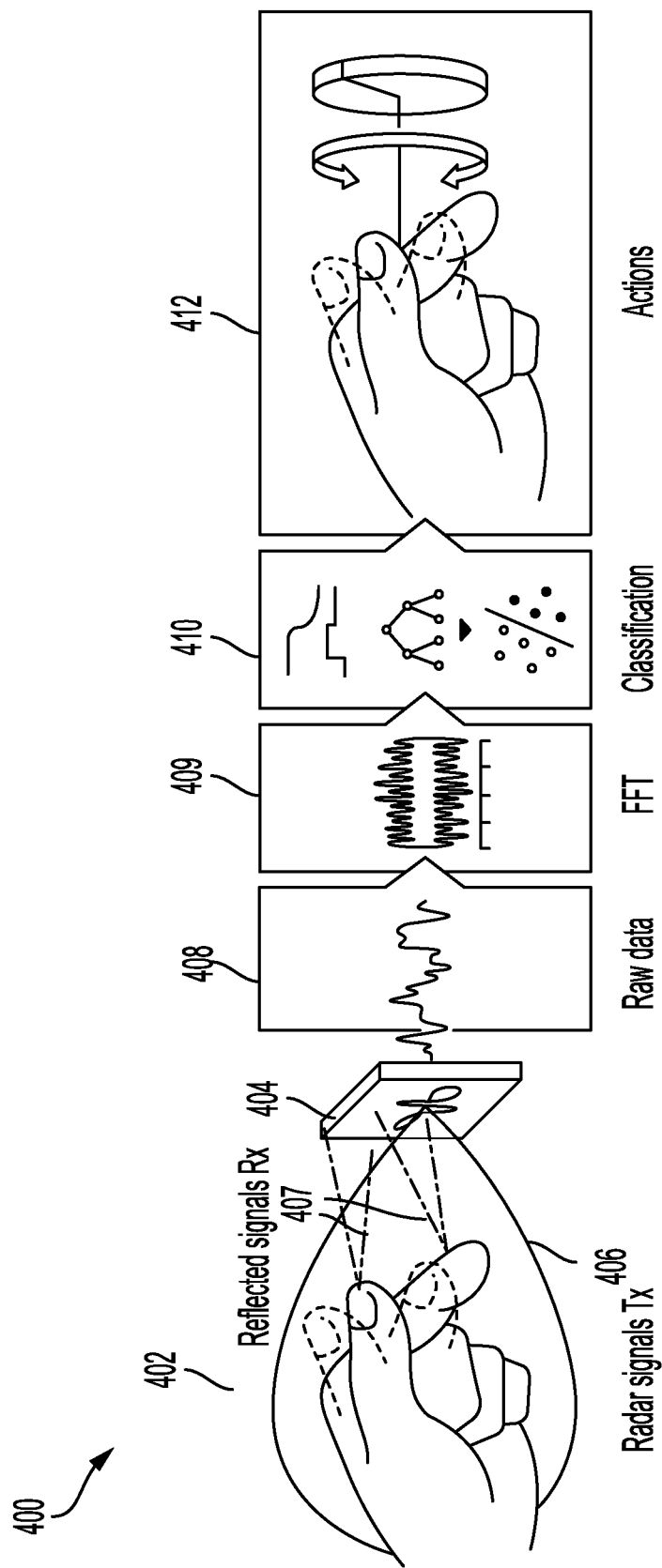
FIG. 4 is a block diagram illustrating an example system for hand gesture recognition, in accordance with aspects of the present disclosure.

Radar systems may be integrated into mobile/handheld devices. Handheld radar devices may serve in applications such as gesture classification, in-car-based control, etc. FIG. 4 is a block diagram 400 illustrating an example system for hand gesture recognition, in accordance with aspects of the present disclosure. As shown in FIG. 4, a hand gesture 402 may be detected via sensing chips 404 in a mobile device, for example. The sensing chips 404 may send radar signals (Tx) 406 with a predefined waveform, such as frequency-modulated continuous wave (FMCW) and pulse. Reflected receive (Rx) signals 407 are correlated with the transmit (Tx) signals 406 to obtain raw data 408, such as the range, Doppler, and angle information. A frequency analysis 409 may be performed on the raw data 408. For example, the frequency analysis 409 may be a fast Fourier transform (FFT). The output of the frequency analysis 409 is provided to a machine learning system 410, e.g., a CNN, SVM, etc. to classify the gesture. The machine learning system 410 may classify the data, resulting in the mapping of the sensed hand gestures 402 to designated actions 412. Benefits include imaging the environment (e.g., three-dimensional (3D) map for virtual reality (VR)), high resolution localization (e.g., industrial internet of things (IIoT)), assisting the communication (e.g., accurate beam tracking), and may be used for machine learning-based applications (e.g., an effective interface between human and machine).

Solutions for radar devices may be based on a deep learning pipeline to make the analyses. The captured data may be processed to a range-Doppler image, with range and Doppler speed estimation. Other features may include angle information, signal strength variation, and others. Solutions may also be based on conventional methods, such as a support-vector machine (SVM) or decision tree, however, the performance is not as good with the deep learning methods.

The radar device may be configured in several ways. For example, in a first optional configuration, the radar device may be a millimeter wave (mmWave)-based dedicated radar with a frequency-modulated continuous wave (FMCW) waveform. In a second optional configuration, the radar device may be an mmWave-based Wi-Fi chip, with a pulse-based radar. In a third optional configuration, the antennas may be configured in the front or two sides of the radar device.

Unfortunately, using range-Doppler images (RDIs) presents multiple challenges. For instance, RDIs provide a limited dataset. That is, features in the RDI may be considered as a one channel image. The detected target may be represented as a highlighted pixel, the x-dimension and y-dimension may be mapped to the Doppler speed and range index, and the shape of the set of the highlighted pixels may correspond to the speed and range variation in the measured frame duration. Unlike a camera-based picture, there are no other available images with the RDI. As such, most traditional methods for data augmentation are not available for the radar features. Moreover, because radar device configuration may have different features, other captured data may not be easily used to enlarge the data set. RDIs may also differ with different antenna beam configurations.

Another challenge presented by RDIs is that RDI involves random frame dropping in the captured sequence. That is, sensors usually capture the data sample-by-sample as one sequence, for example, with index 0,1,2,3 . . . , etc. Hardware constraints (e.g., limited computation capability, and limited power or buffer size) may lead to random frame dropping, which destroys the sequence order information.

A third challenge presented by the captured RDI sequence is that RDI sequences mix noise portions and target motion portions. Unfortunately, the target motion portions are difficult to identify in the mixed sequence, because noise RDI show similar characteristics to those of the target motion, and conventional vision-based solutions are not applicable.

Accordingly, aspects of the present disclosure are directed to restoring a full input sequence. In some aspects, the sequence order may also be restored. Additionally, in some aspects, noise portions of the input sequence may be predicted, identified, and removed to produce a sequence including a reduced number of noise portions. In some aspects, the resulting sequence may include only the target motion portions (e.g., pure portions).

Figure 5:
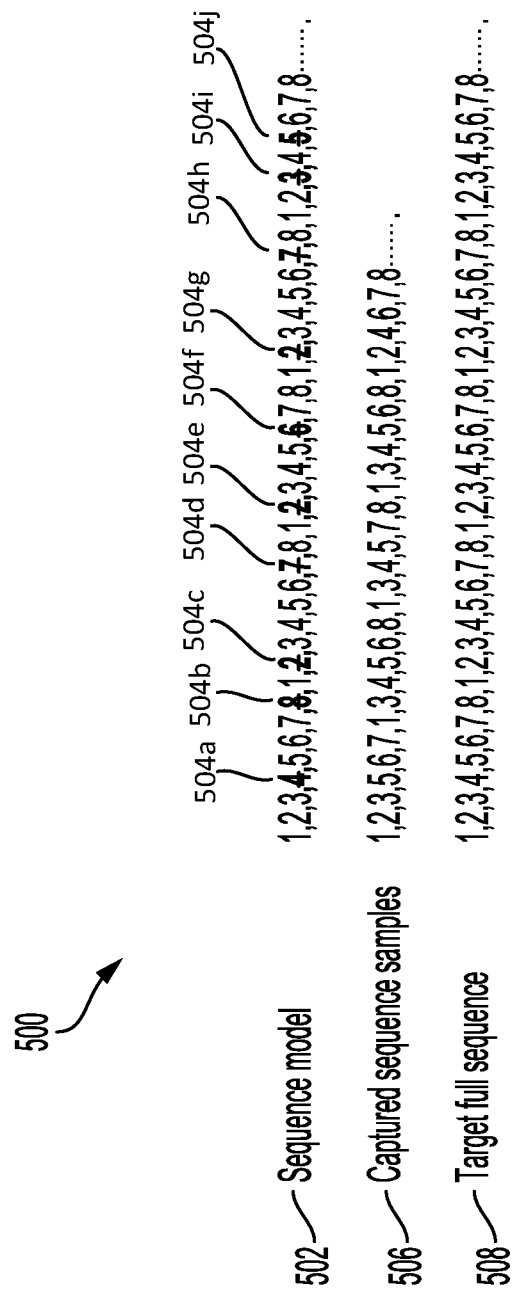
FIG. 5 is a diagram illustrating an example restoration of a full sequence, in accordance with aspects of the present disclosure.

FIG. 5 is a diagram illustrating an example restoration 500 of a full sequence, in accordance with aspects of the present disclosure. In the example of FIG. 5, a sensor (e.g., sensors 114 of FIG. 1) may capture a time series with many repetitions. A sequence model 502 includes a pattern 1, 2, 3, 4, 5, 6, 7, 8, which is repeated several times. However, large random samples are dropped. For example, samples 504a-j may be dropped, resulting in captured sequence samples 506 that includes only a portion of the sequence model 502. In accordance with aspects of the present disclosure, the captured sequence 506 may be processed to augment, and in some implementations, restore a target full sequence 508.

Figure 6A:
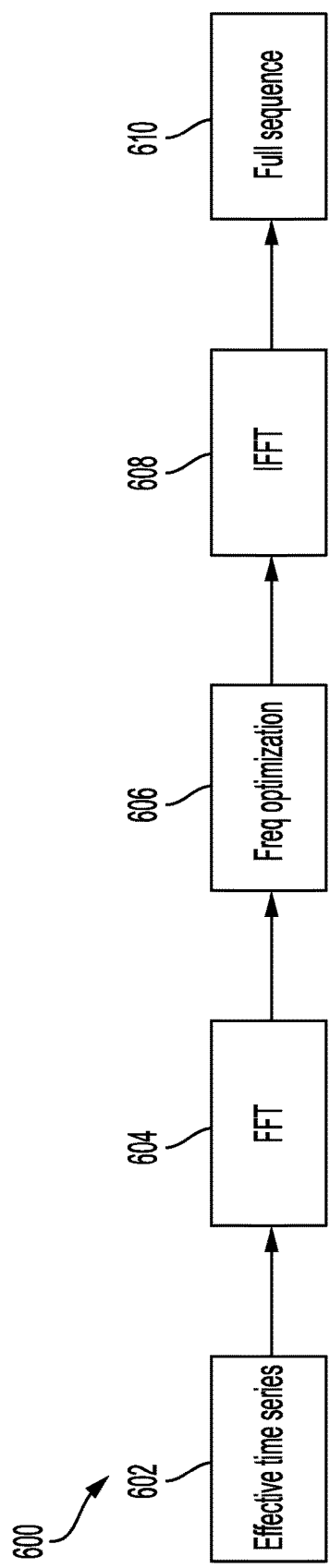
FIGS. 6A and 6B are block diagrams illustrating example processes for restoring a full sequence, in accordance with aspects of the present disclosure.
Figure 6B:
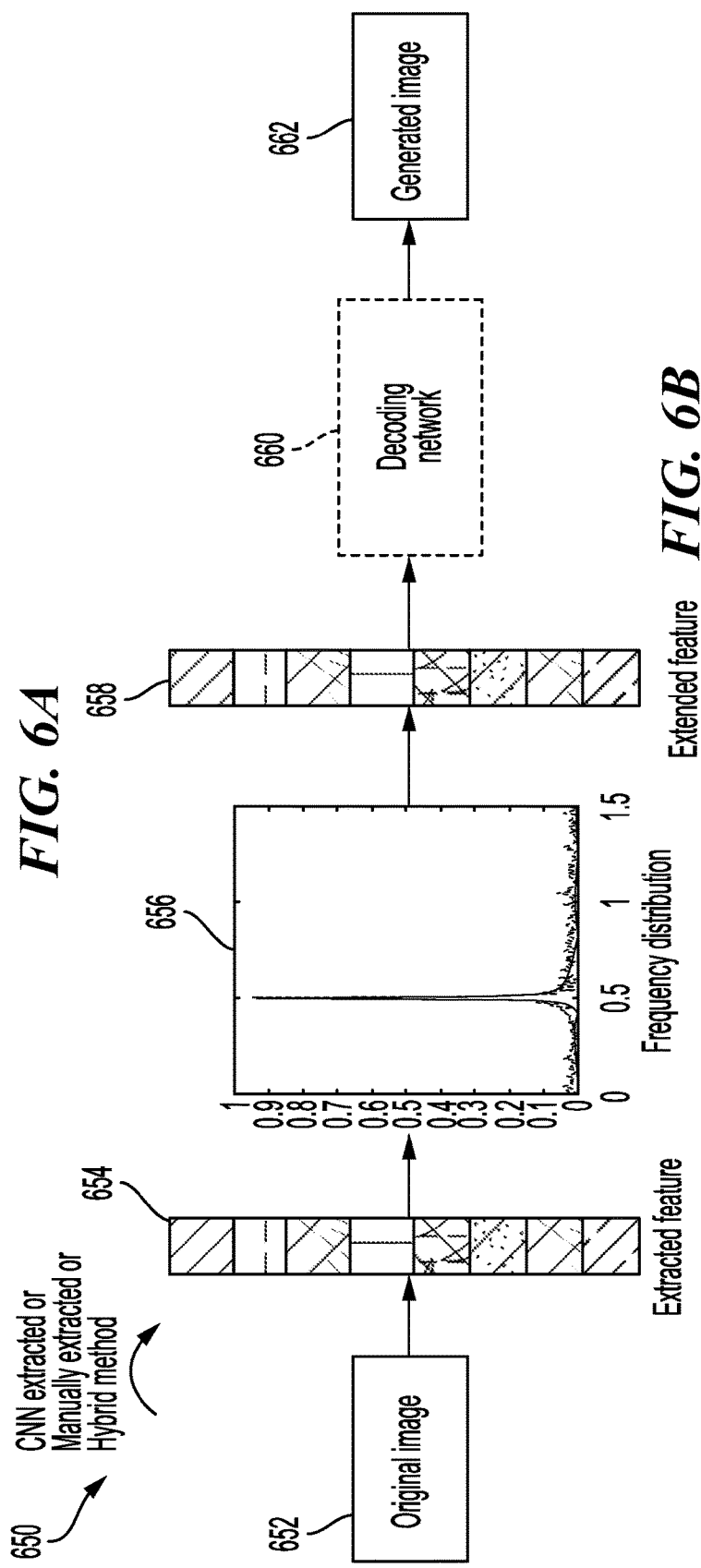

FIGS. 6A and 6B are block diagrams illustrating example processes 600 and 650 for restoring a full sequence, in accordance with aspects of the present disclosure. Full sequences and captured sequences with sample dropping hold the same main frequency distribution. As shown in FIG. 6A, in block 602, an effective time series sequence may be received as an input. In block 604, a frequency distribution of the input sequence may be determined. For example, the frequency distribution may be determined using a fast Fourier transform (FFT). In block 606, frequency optimizations such as noise or interference cancellation may optionally be applied. In block 608, the time domain information of the sequence may be recovered. For example, the time domain information may be restored by performing an inverse fast Fourier transform (IFFT) operation on the frequency distribution information based on the average frame-dropping ratio for the input sequence. In some aspects, the average frame-dropping ratio may be a predefined system parameter. In some aspects, the average frame-dropping ratio may be determined via the network. In one example, the average frame-dropping ratio may be computed relative a specified frame rate (e.g., 60 frames per second (FPS)). Where the average frame rate for a captured sequence, within one time duration is 50 FPS, the average frame-dropping ratio may be computed as the 5/6. The average frame-dropping ratio may be provided for IFFT processing to restore the time domain information. In turn, in block 610, the full sequence is restored based on the restored time domain information.

As shown in the example of FIG. 6B, the input sequence may include an image 652, such as a range-Doppler image (RDI). For instance, a sequence of RDIs may represent a radar-based gesture. Each image 652 in a sequence may be processed to extract or determine features 654 to represent the image 652. In some aspects, the features 654 may be determined based on principal component analysis or similar techniques, for example. The features 654 may also be extracted via a convolutional neural network (CNN) (e.g., the deep convolutional network 350 of FIG. 3 or encode block 702 of FIG. 7). The extracted features 654 may be processed to determine a frequency distribution 656 for the sequence of images 652. For example, an FFT operation may be performed on the extracted features 654 representing the sequence of images 652 to determine the corresponding frequency distribution 656. Additional processing may also determine extended features 658. For instance, in some aspects, noise may be identified and reduced. Furthermore, in some aspects, the noise may be canceled or removed.

The extended features 658 may be supplied to a decoding network 660 (e.g., a CNN such as decoding block 704 of FIG. 7) to restore time domain information and generate a reconstructed image 662 for each image 652 in the input sequence. In some aspects, the time domain information may be restored by performing an inverse fast Fourier transform (IFFT) operation on the frequency distribution information. Additionally, in some aspects, the time domain information may be restored based on an average frame-dropping ratio for the input sequence.

Figure 7:
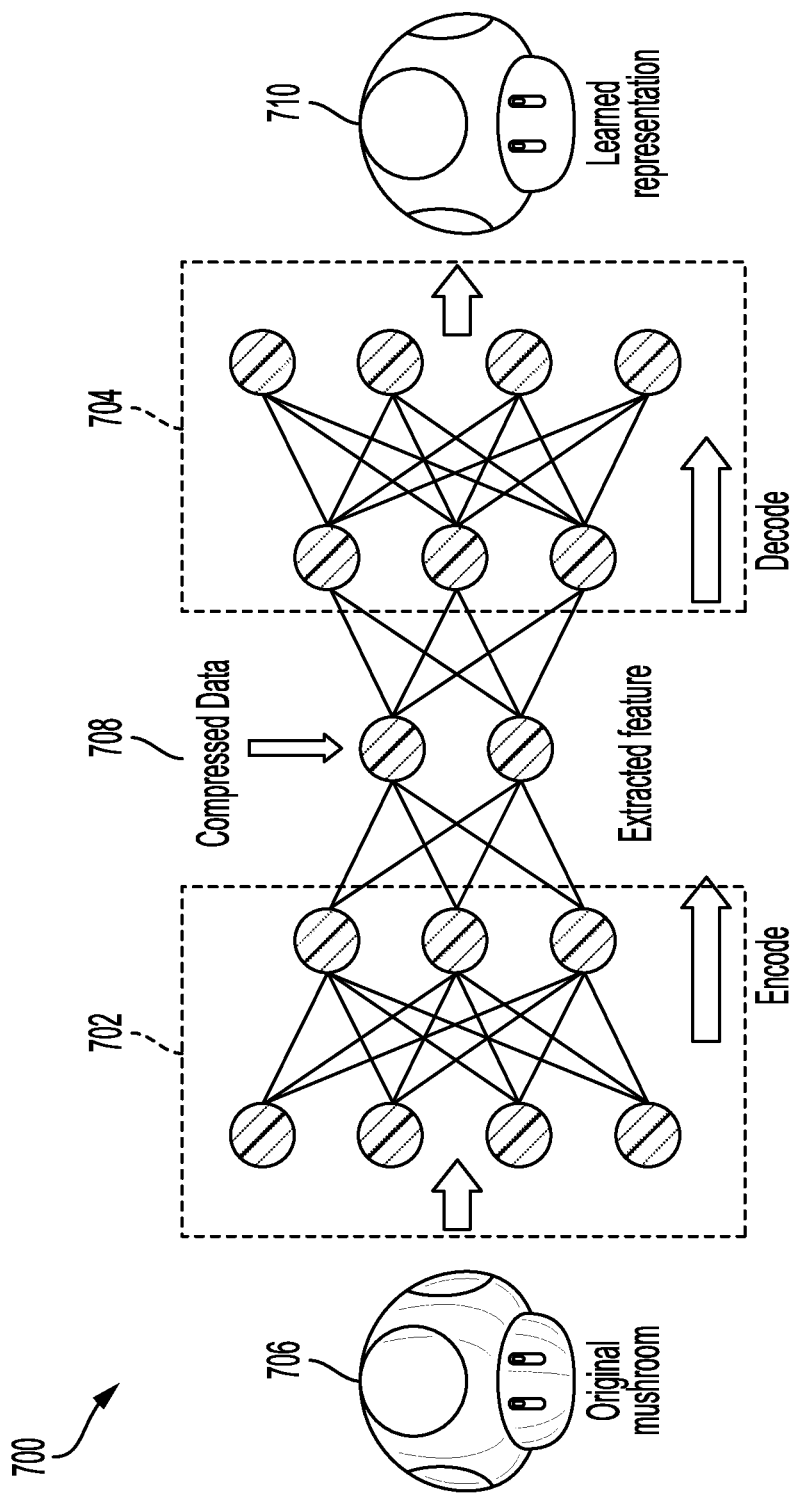
FIG. 7 is diagram illustrating an example architecture for extracting the features of an input with random frame dropping in encoding block, and restoring the sequence of an output with frequency domain processing in decoding block, in accordance with aspects of the present disclosure.

FIG. 7 is diagram illustrating an example architecture 700 for restoring input sequences with random frame dropping, in accordance with aspects of the present disclosure. Referring to FIG. 7, the architecture 700 may include an artificial neural network configured as an auto-encoder. That is, the architecture 700 may include an encoding block 702 and a decoding block 704. The encoding block 702 and the decoding block 704 may be jointly trained and optimized. The encoding block 702 may receive an input image 706 (e.g., shown as an original mushroom). The encoding block 702 compresses the input image 706, extracting features 708 to represent the image 706. The extracted features 708 are supplied to the decoding block 704. The decoding block 704 the processes the extracted features to produce a reconstructed or learned representation 710 of the original image 706.

Figure 8A:
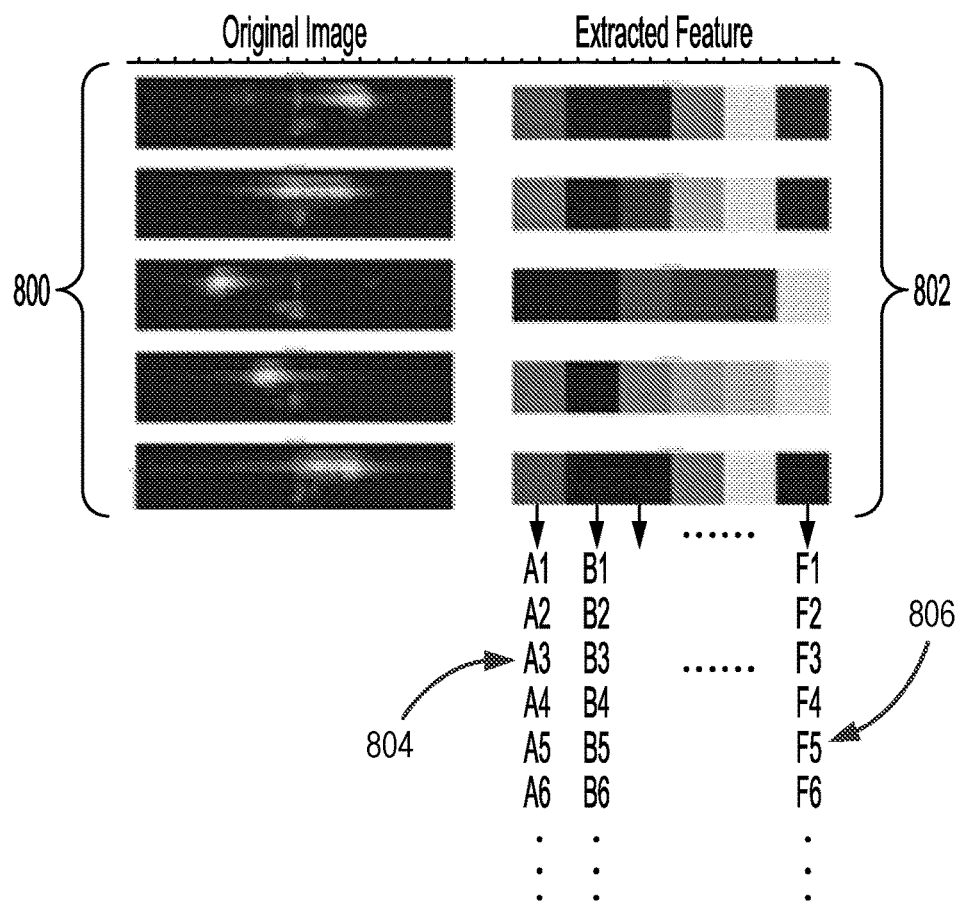
FIG. 8A is a diagram illustrating extraction of features from a sequence of range-Doppler images (RDIs), in accordance with aspects of the present disclosure.

FIG. 8A is a diagram illustrating extraction of features from a sequence of range-Doppler images (RDIs) 800, which may, for example, represent a particular gesture, in accordance with aspects of the present disclosure. In one example implementation, the input image 706 of FIG. 7 may be a sequence of RDIs. In the example implementation, the encoding block 702 may be trained to extract features (e.g., 802) to represent each RDI in the sequence of RDIs 800. Referring to FIG. 8A, each of the extracted features 802 representing an RDI image may be a 1×6 vector, shown as [A, B, C, D, E, F]. That is, each RDI of the RDI sequence 800 is represented by a six-dimensional singular sequence (e.g. 804 and 806). Of course, the dimensions of the extracted features are merely examples, for ease of illustration and not limiting. Each dimension of the singular sequence (e.g., A3 and F4) is one time series, which serves as the input of the frequency analysis (e.g., FFT). Frequency analysis operations (e.g., a FFT operation) may be performed on the extracted features (e.g., 804) to produce a frequency distribution (e.g., 850 of FIG. 8B). In some aspects, the encoding block 702 may be trained to identify and reduce noise (e.g., 854 of FIG. 8B) in the frequency distribution (e.g., 850).

According to the exemplary implementation, the decoding block 704 may be trained to restore a sequence of RDIs (e.g., RDIs 800). The frequency distribution (e.g., 850) corresponding to the extracted features 708 may be supplied to the decoding block 704. The decoding block 704 processes the frequency distribution corresponding to extracted features 708 to restore the RDI sequence. In some aspects, the RDI sequence may be restored based on an average frame-dropping ratio. Accordingly, relative to the input sequence of RDIs 800, the output (e.g., 710) may include additional images in the sequence of RDIs, which may be considered as data augmentation. In some aspects, the average frame-dropping ratio may be an optimized parameter of the auto-encoder (e.g., 700). Accordingly, the auto-encoder (e.g., 700) may be implemented with different ratios to modify a data augmentation level.

In some aspects, the order of a sequence (e.g., RDIs 800) may also be restored. For instance, each dimension (e.g., A1) may be processed (e.g., via encoding block 702) to produce the frequency distribution (e.g., 850). The frequency distribution (e.g., 850) may be processed (e.g., via decoding block 704) to produce a corresponding output that is an extended singular sequence in one dimension with the restored sequence order information. That is, each of the six-dimensions, the 1×6 vector (e.g., 804) representing the restored sequence (which may be referred to as the augmented sequence) may be decoded to one RDI image via the decoding block 704. The RDI sequence including each such RDI image includes additional RDI images relative to the input sequence of RDIs (e.g., 800) with the same sequence order information as the input sequence of RDIs (e.g., 800).

Figure 8B:
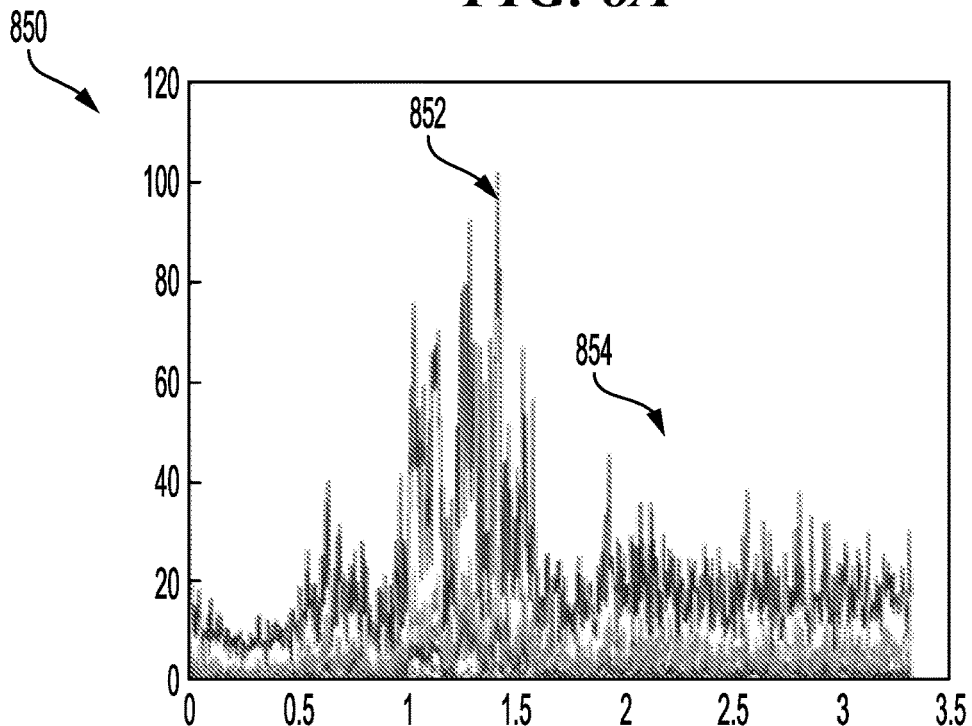
FIG. 8B is an example graph of a frequency distribution corresponding to a sequence of range-Doppler images (RDIs), in accordance with aspects of the present disclosure.

FIG. 8B is an example graph of a frequency distribution 850 corresponding to the sequence of range-Doppler images (RDIs) 800, in accordance with aspects of the present disclosure. As described above, a frequency distribution may be determined by performing an FFT operation on the extracted features 802 of the RDIs 800. A peak frequency 852 may be identified as corresponding to a maximum or peak frequency in the frequency distribution 850. The peak frequency 852 may provide an indication of a length of one cycle. That is, for any length in the extended time series after the augmentation, in the frequency domain distribution, the parameter of the inverse fast Fourier transform (IFFT) size would decide the length of the output. Boundaries for segments of the input sequence may then be determined based on the length information. Other portions of the frequency distribution 850, such as a high frequency portion 854, may be evidence of noise or interference. In some aspects, optimization in a frequency domain may reduce the noise effect. For example, the high frequency portion 854 may be removed, which may be equivalent to reducing the noise. The optimized frequency information may be processed (e.g., via decoding block 704) to produce an augmented data set which includes the input (e.g., RDIs 800) and additional data (e.g., one or more additional RDIs).

Figure 9A:
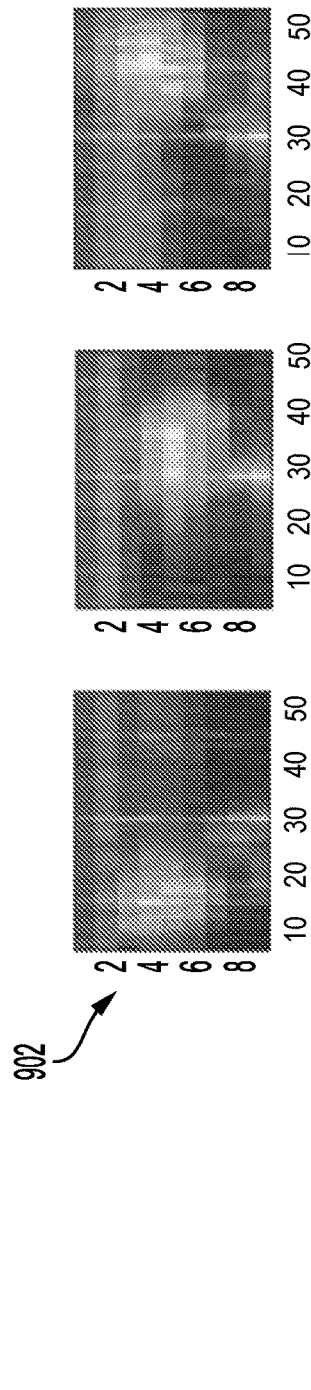
FIGS. 9A-C are diagrams illustrating a restored sequence and data augmentation for a sequence of range-Doppler images (RDIs), in accordance with aspects of the present disclosure.
Figure 9B:
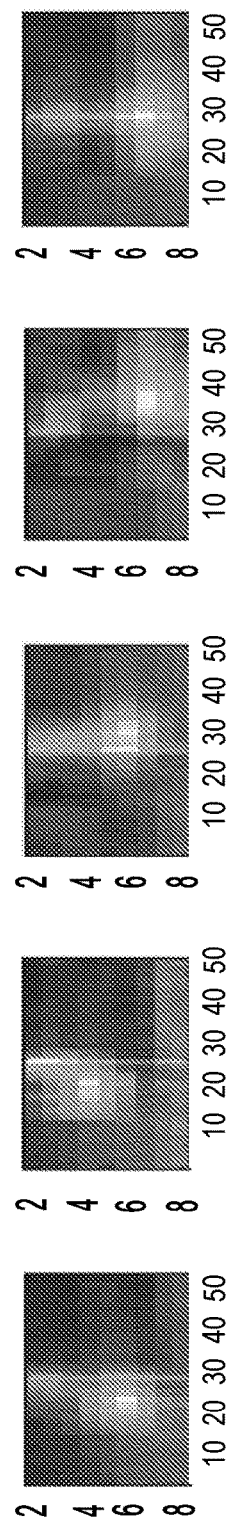
Figure 9C:
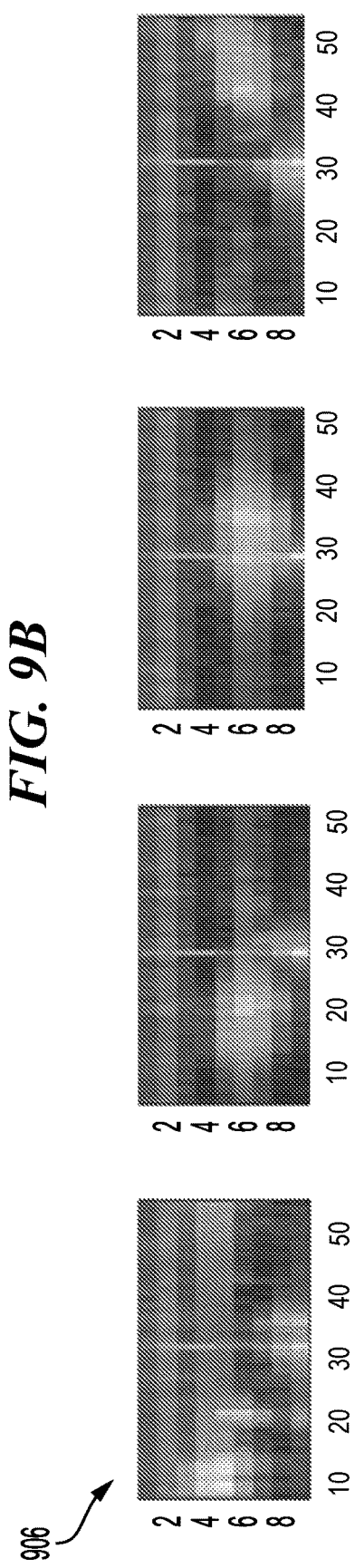

FIGS. 9A-C are diagrams illustrating data augmentation for a sequence of range-Doppler images (RDIs), in accordance with aspects of the present disclosure. FIG. 9A shows an example captured input sequence of RDIs 902. The example captured input sequence of RDIs 902 has a large frame rate with a frame dropping of 40 percent. FIGS. 9B and 9C illustrate example restored sequences 904 and 906. The X and Y axes represent pixel indices in each of FIGS. 9A-C. As shown in FIGS. 9B and 9C, respectively, by processing the captured input sequence of RDIs as described with reference to FIGS. 6A-B, the data in the input sequence may be augmented, increasing the diversity of the dataset of the input sequence to restore the full input sequence, prior to dropping samples (e.g., about zero percent frame dropping). For instance, as shown in FIG. 9B, the captured input sequence of RDIs 902 including three RDIs is augmented with two additional RDIs included in the restored sequence 904. The augmentation may occur as described above with respect to FIG. 6A. That is, a frequency distribution of an input sequence may be determined. Frequency optimizations such as noise or interference cancellation may optionally be applied. The time domain information may be restored, for example, by performing an inverse fast Fourier transform (IFFT) operation on the frequency distribution information based on the average frame-dropping ratio for the input sequence. The full sequence is restored based on the restored time domain information.

In some aspects, having restored the full input sequence (shown as 904), a different level of dropping may be applied. For instance, in FIG. 9C, the restored sequence 906 includes four RDIs reflecting a lower frame dropping rate (e.g., fifteen percent) than the sequence of RDIs 902.

Accordingly, based on the method described above, the diversity of the dataset may be increased and the dataset of the captured input sequence may be augmented. In doing so, any degree or amount of samples dropping may be obtained depending on the tradeoff of processing speed and accuracy. For instance, less frame dropping results in more frames to be considered in determining a classification result and may result in improved classification accuracy. On the other hand, more frame dropping results in less information to process, which may decrease the processing time to produce a classification result that may be less accurate.

Thus, using a data augmentation method, information in the data sets are increased. After the sequence restoration, the sequence order information may be restored to further increase a corresponding accuracy for gesture recognition. That is, after encoder processing (e.g., via encoding block 702), the extracted features of the sequence may be provided, for instance, such that each image (e.g., an RDI in RDIs (800)) is represented by one 1*6 vector with 6 dimensions (e.g., see 802). The RDI sequence (with N images) (e.g., 800) is thus represented as the 6*N matrix, each dimension would be one single value sequence 1*N (e.g., B4), and there are six singular sequences for six dimensions.

Each singular sequence (N samples) may be processed in the encoding block (e.g., 702) to determine a corresponding frequency distribution and supplied to a decoding block (e.g., 704). The decoding block (e.g., 704) may process the frequency distribution and generate an output including additional RDI images according to N/(average frame-dropping ratio). That is, the input sequence then corresponds to a longer sequence with the additional dropped frames (RDI images), while maintaining the order of the input sequence.

Radio frequency (RF) sensing may be used with a radar signal to image an environment, based on information, such as range, Doppler, and angle information. A higher frequency, larger bandwidth, compact array may achieve a greater granularity, applicable for a mobile device or an access point for sensing.

Figures 1, 10A:
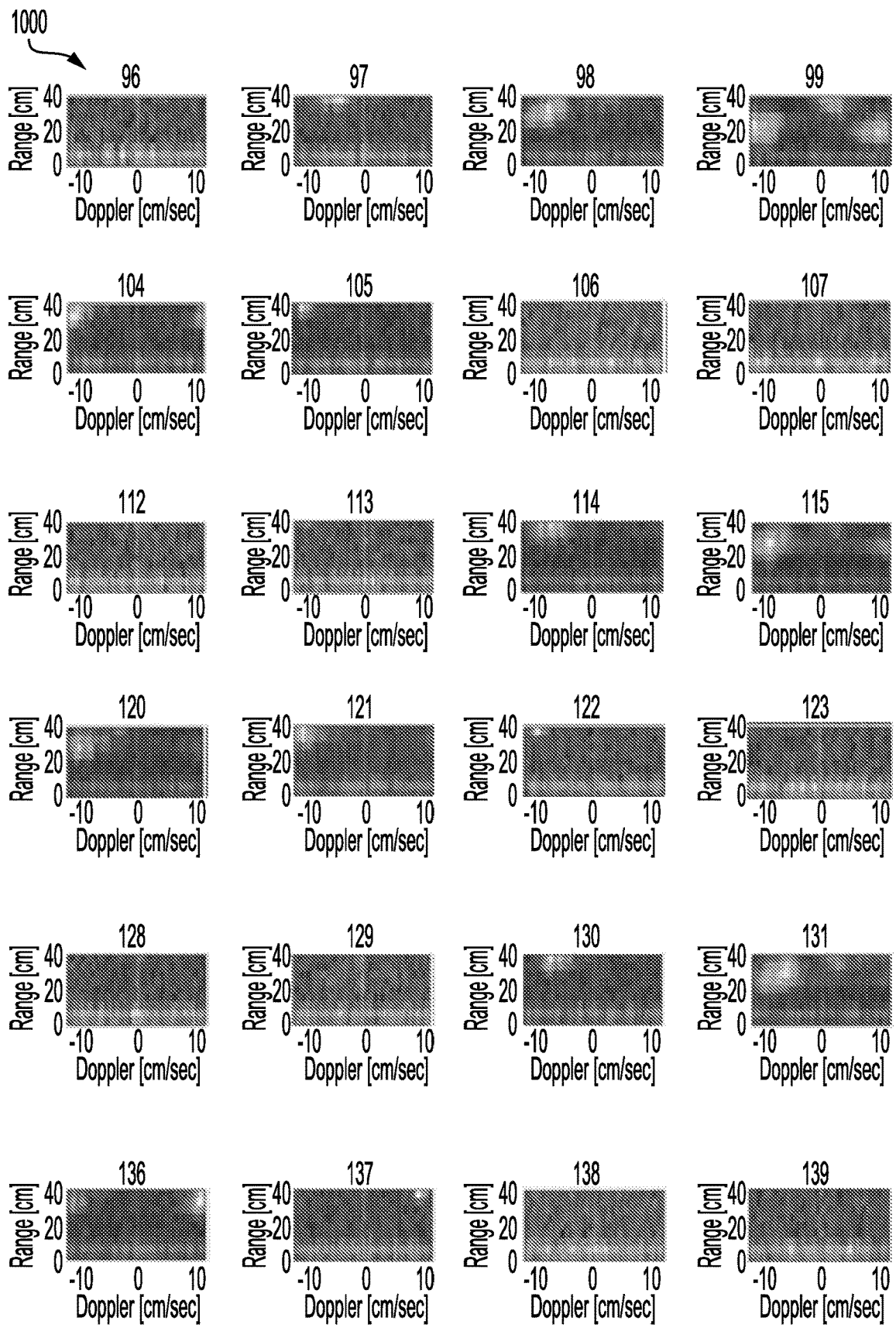
Figures 2, 10A:
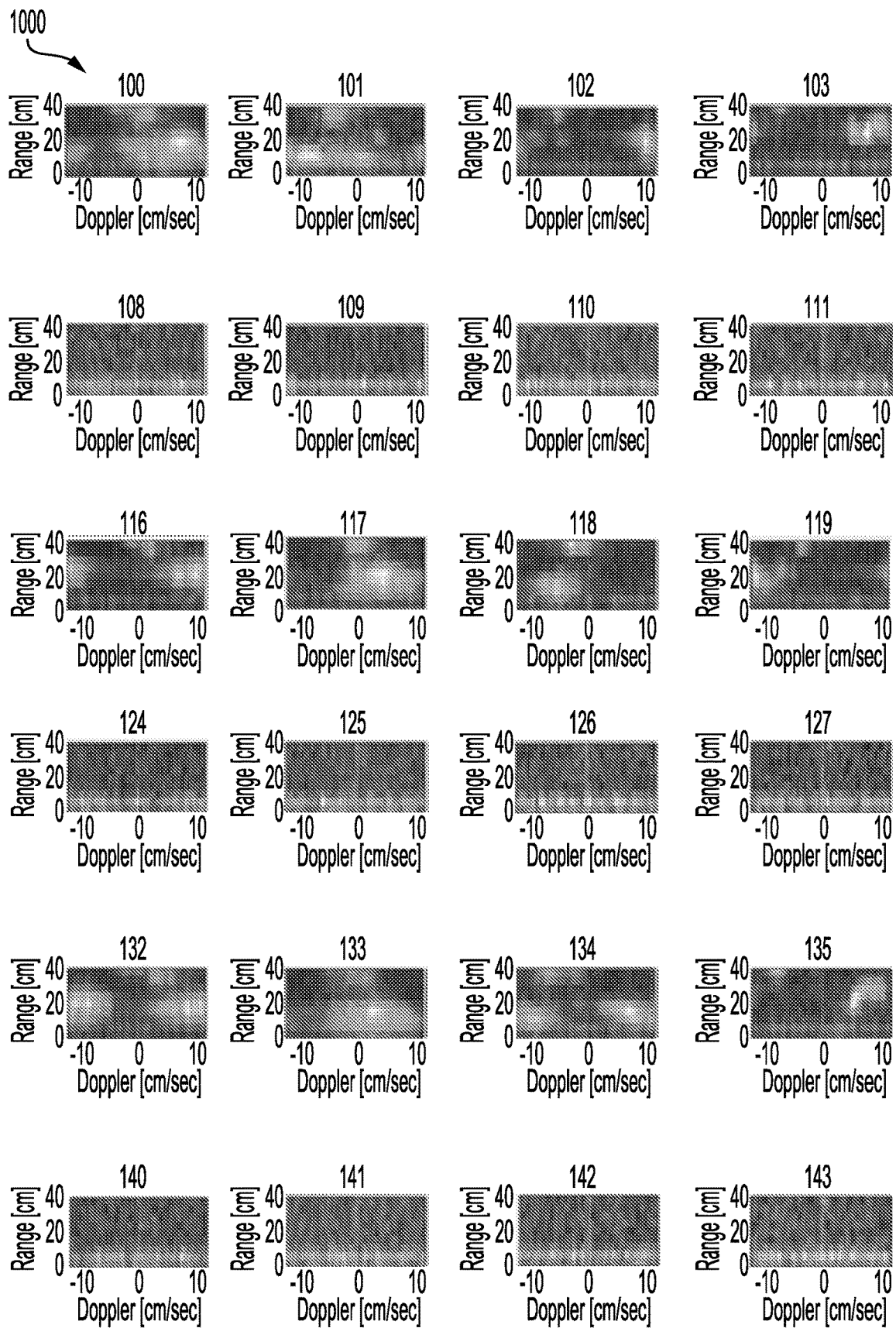

As described previously, handheld radar devices may serve in applications such as gesture classification, in-car-based control, etc. One challenge, however, is how to fetch the clean gesture data. Unlike typical images, it is difficult to decide on the starting and ending point based on vision. FIGS. 10A-1 and 10A-2 show a long sequence of range-Doppler images (RDIs) 1000 corresponding to a swipe left gesture and a logging procedure, in accordance with aspects of the present disclosure. The long sequence of RDIs 1000 may include target motions (e.g., swipe left) as well as noise (including the background noise, interference, or other non-target portions).

Figure 10B:
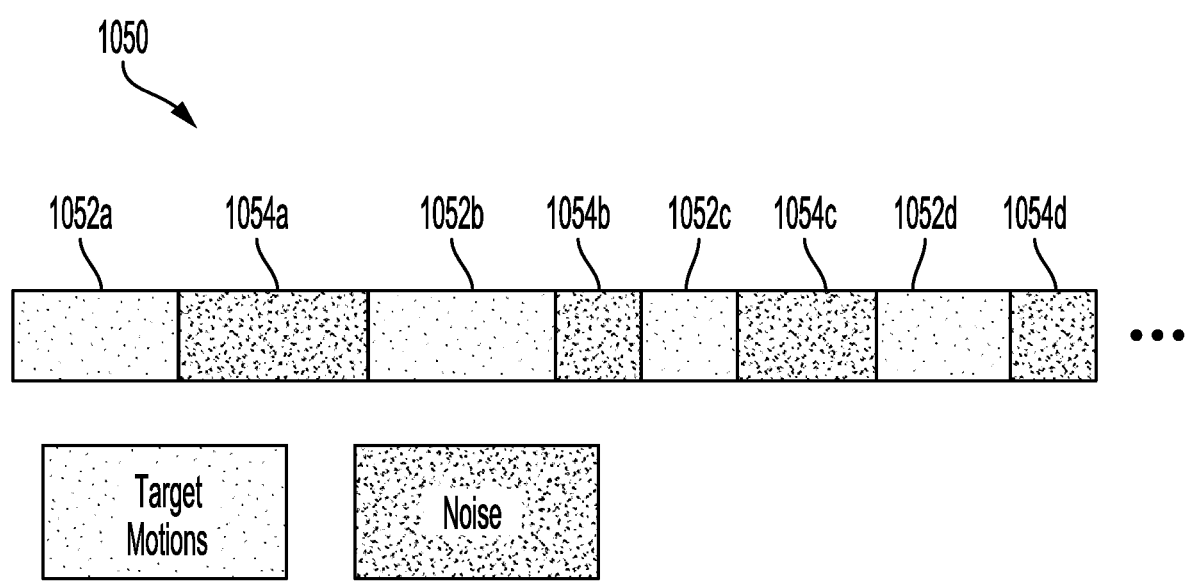
FIG. 10B is a diagram illustrating a simplified view of a long sequence, in accordance with aspects of the present disclosure.

FIG. 10B is a block diagram illustrating a simplified view of a long sequence 1050, in accordance with aspects of the present disclosure. As shown in FIG. 10B the long sequence 1050 may include target motion portions (e.g., 1052a-d) and noise portions (e.g., 1054a-d). Both of the target motion portions 1052 and the noise portions 1054 may have different lengths. Based on vision, it may be difficult to identify noise, interference, and the gesture.

Generally, for radio frequency (RF) sensing motion recognition, clean gesture data may enable more accurate gesture detection. A vision or video-based system may perform the segmentation. In vision-based systems, RF sensing data and the corresponding data are fetched at the same time as video capturing the motions. Motion portions may be manually set during offline training to match the observation of the video. However, this procedure is costly and depends on correct synchronization between the radio frequency (RF) sensing sequence and video. Additionally, manual labeling involves intensive human time and effort.

Accordingly, aspects of the present disclosure include general solutions for segmentation in image as well as prediction and removal of noise portions. The method may not directly segment the target portions. That is, clean motion sequence targets may be difficult to fetch because it is difficult to clearly identify what or where the target sequence is located. Thus, aspects of the present disclosure identify and remove the noise portion (e.g., including background, power leakage, and some random interference). After removing the noise portion, the remainder of the sequence may be considered to be a target motion portion.

Based on the segmentation, the target portions are fetched and the noise portions in the long continuous sequence are removed. In accordance with aspects of the present disclosure, pure noise data and other pure motions, including background, power leakage, and some random interference are captured. Other pure motions, which do not involve any noise, but include some gesture features, may also be captured. For example, the continuous wave, swipe-left/right, and its repetition can be captured. Additionally, the continuous pull-push can also be captured.

A pre-trained network may identify the noise portions. The network may learn the correct background feature. As the range-Doppler information in one image is limited, in order to reduce a false alarm, the sequence-based noise prediction is considered. In other words, one sequence portion is predicted as the noise rather than one image.

Based on the network, the noise portion is predicted and removed from the sequence. In some aspects, a sliding window may accurately identify a motion sequence boundary.

Figure 11:
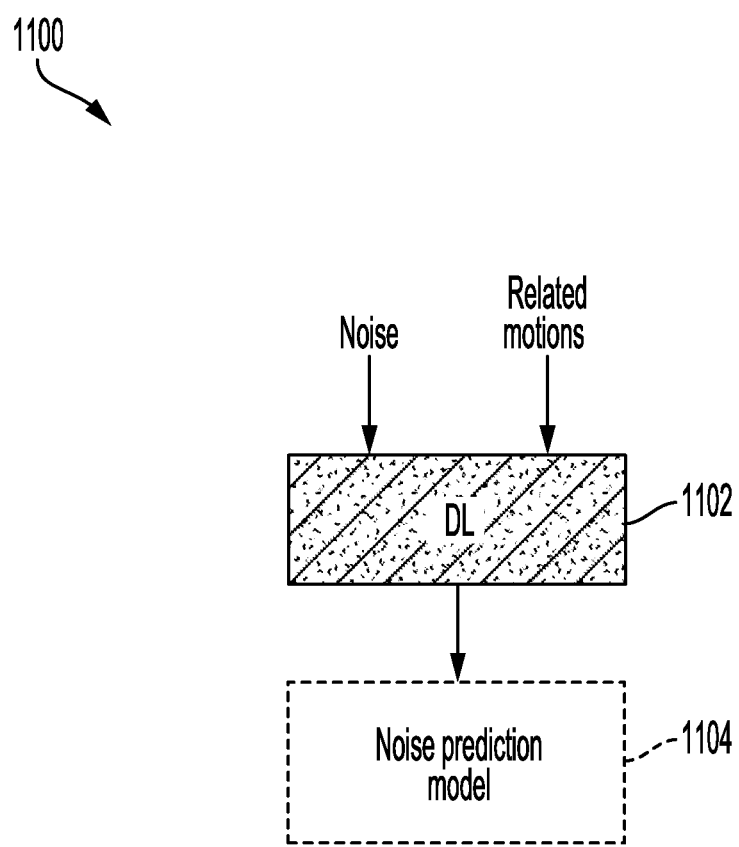
FIG. 11 is a block diagram illustrating an example architecture of a binary classification model for noise session identification, in accordance with aspects of the present disclosure.

FIG. 11 is a block diagram illustrating an example architecture 1100, in accordance with aspects of the present disclosure. The architecture 1100 includes a deep learning (DL) network 1102. The deep learning network 1102, may for example, be a convolutional neural network (e.g., the DCN 350 of FIG. 3). The deep learning network 1102 may receive as an input noise and related motions. The deep learning network 1102 may be trained to recognize the noise portions to produce a noise prediction model 1104.

The noise prediction model 1104 may identify the noise portions. That is, the noise prediction model 1104 may receive an input sequence including noise and other related motions and classify the noise. The noise prediction model 1104 may extract features of the input sequence and determine a prediction of whether a portion of the sequence is a noise portion. In turn, a noise portion may be identified and the noise portion of the sequence may be removed. For example, a noise portion may be identified when the noise prediction is above a predefined threshold value.

Figure 12:
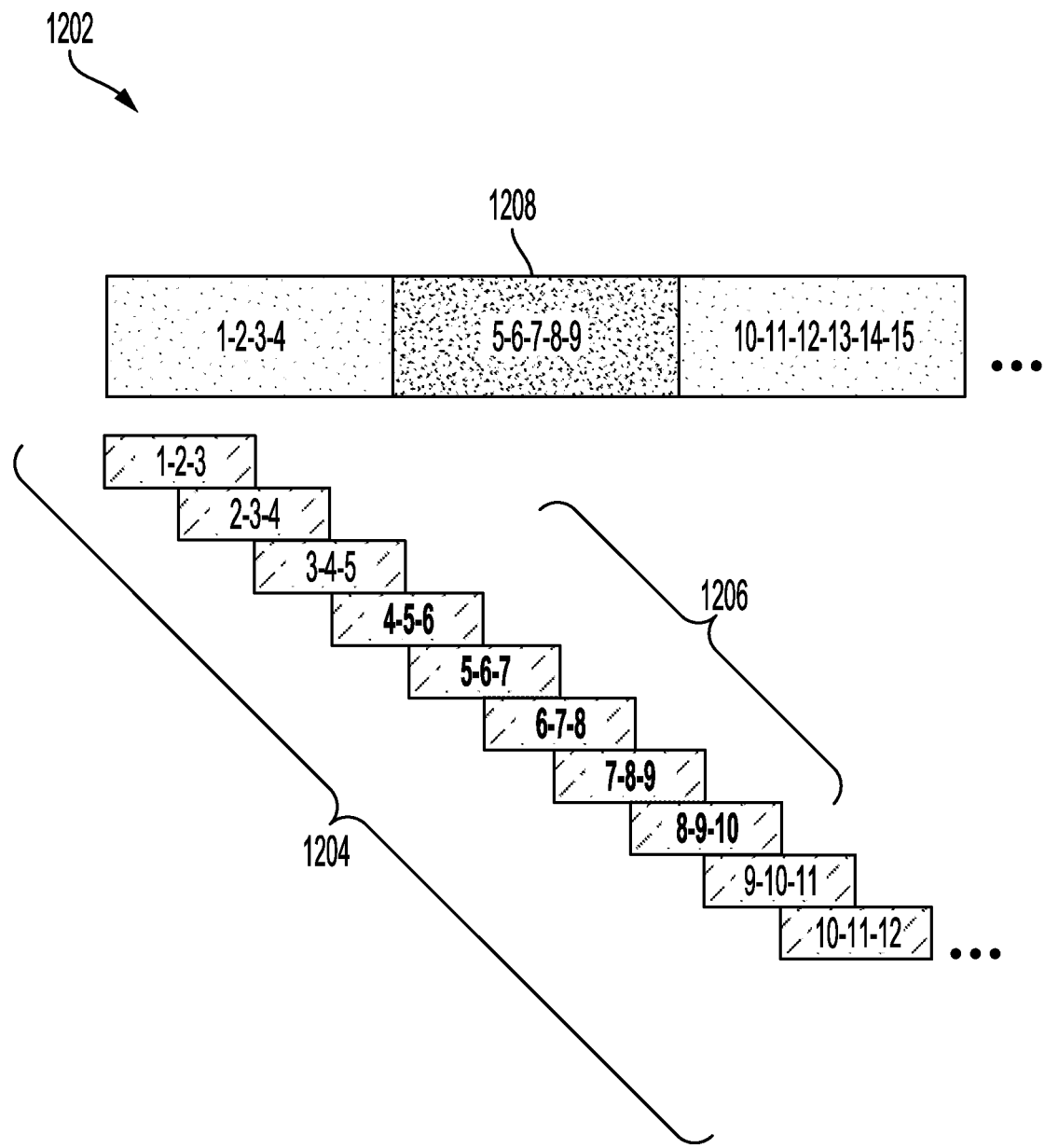
FIG. 12 is a block diagram illustrating example processing for removing noise, in accordance with aspects of the present disclosure.

FIG. 12 is a block diagram illustrating example processing for removing noise, in accordance with aspects of the present disclosure. Referring to FIG. 12, a long sequence 1202 (e.g., 1-2-3-4-5-6-7-8-9-10-11-12-13-14-15 . . . ) is received. A sliding window (e.g., length=3) 1204 may be defined to fetch sequence portions (e.g., 1, 2, 3, . . . ). In the example of FIG. 12, the sequence portions may be fetched one sequence portion at a time. The sequence portions in each sliding window 1204 are input to the network for inference, and the network outputs the prediction. As shown in FIG. 12, section 1208 may include noise or interference, for ease of illustration. The network (e.g., noise prediction model 1104 of FIG. 11) processes the portions in each of the sliding window 1204. The prediction for each of sliding windows 1-3 is noise, thus the corresponding sequence portions (1, 2, 3, 4, and 5) are also defined as noise. On the other hand, the predictions for each of sliding windows 4-8 is target motion, thus the corresponding sequence portions (e.g., 4, 5, 6, 7, 8, 9, and 10) are also predicted to be noise. An overlap may exist where a sequence portion is predicted to be noise and target motion, as is the case with sequence portions 4, 5, and 10. Overlapping sequence predictions may be determined according to design preference. In some aspects, prediction for the overlapping portion may be based on a length of the predicted target sequence portions. For example, if the number of other sequence portions predicted to be target sequence portions is smaller, the sequence may be deemed a target sequence portion. On the other hand, in some aspects, the prediction for the overlapping portion may be based on whether clear targets are to be used. For example, if totally clear targets are desired, the prediction model may classify a sample (e.g., a sliding window 1204) with any noise labelled as noise. Portions 4-8 (including sequence numbers 4-10 shown as 1206) each include noise. As such, the network (e.g., noise prediction model 1104) may predict that the portions 4-8 (e.g., 1206) are noise portions and may remove such portions. Having removed the noise portions of the sequence 1204, the remaining portions may be identified as target motion portions. In some aspects, the remaining target portions may processed and classified.

Figure 13:
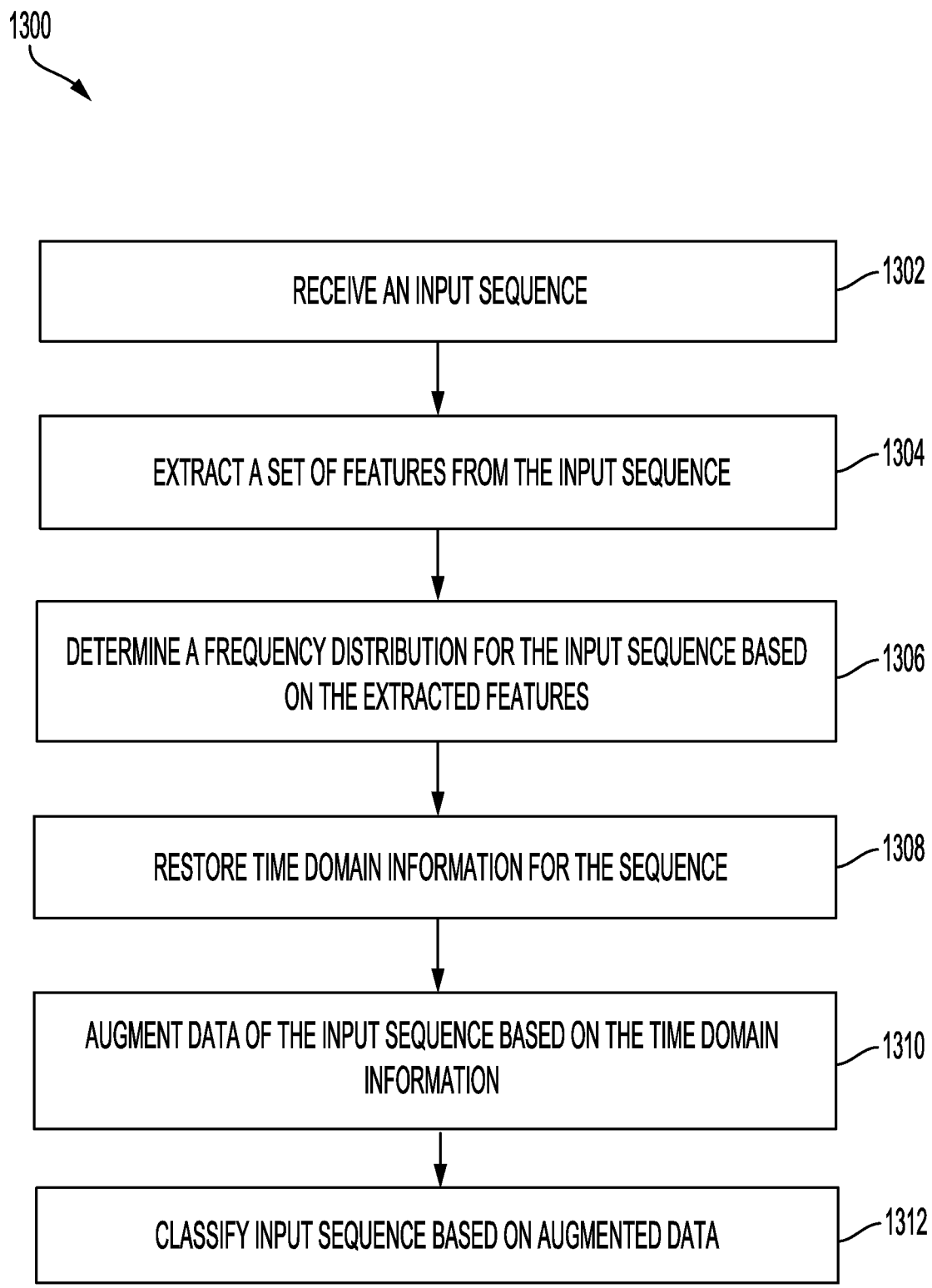
FIG. 13 is a flow diagram illustrating a method for augmenting or restoring a sequence, in accordance with aspects of the present disclosure.

FIG. 13 is a flow diagram illustrating a method 1300 for augmenting or restoring a sequence, in accordance with aspects of the present disclosure. As shown in FIG. 13, at block 1302, an input sequence is received. In some aspects, the input sequence may be one or more range-Doppler images.

At block 1304, a set of features may be extracted from the input sequence. As described in relation to FIG. 6B, each image 652 in a sequence may be processed to extract or determine features 654 to represent the image 652. In some aspects, the features 654 may be determined based on principal component analysis or similar techniques, for example. The features 654 may also be extracted via a convolutional neural network (CNN) (e.g., deep convolutional network 350).

At block 1306, a frequency distribution may be determined for the input sequence based on the extracted features. For example, as described with reference to FIG. 6B, the extracted features 654 may be processed to determine the frequency distribution 656 for the sequence of images 652. For instance, a fast Fourier transform (FFT) operation may be performed on the extracted features 654 representing the sequence of images 652 to determine the corresponding frequency distribution 656.

At block 1308, time domain information may be restored for the sequence. For example, as described with reference to FIG. 6A, the time domain information may be restored by performing an inverse fast Fourier transform (IFFT) operation on the frequency distribution information based on the average frame-dropping ratio for the input sequence. At block 1310, the data of the input sequence is augmented by decoding the time domain information. At block 1312, the input sequence is classified based on the augmented data.

Figure 14:
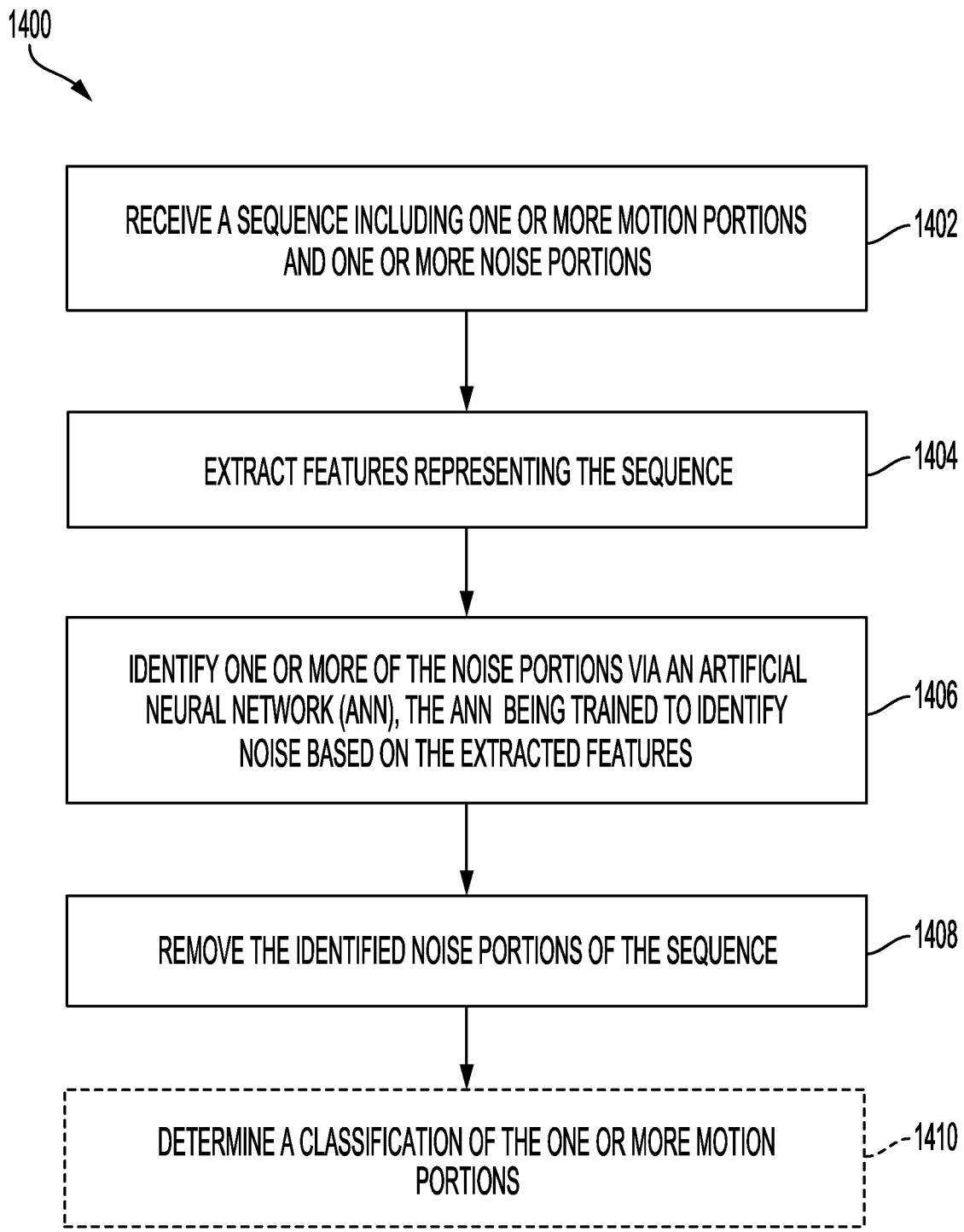
FIG. 14 is a flow diagram illustrating a method for predicting and removing noise in an input sequence, in accordance with aspects of the present disclosure.

FIG. 14 is a flow diagram illustrating a method 1400 for predicting and removing noise in an input sequence, in accordance with aspects of the present disclosure. At block 1402, a sequence including one or more motion portions and one or more noise portions may be received. At block 1404, features representing the sequence are extracted. At block 1406, one or more of the noise portions are identified by a network (e.g., an artificial neural network). The network identifies noise based on the extracted features. At block 1408, the identified noise portions of the sequence are removed. Furthermore, at block 1410, a classification of the one or more motion portions may optionally be determined.

Implementation examples are described in the following numbered clauses:

1. A computer-implemented method comprising:
   receiving an input sequence;
   extracting a set of features from the input sequence;
   determining a frequency distribution for the input sequence based on the extracted features;
   restoring time domain information for the input sequence by performing an inverse fast Fourier transformation on the frequency distribution;
   augmenting data for the input sequence by decoding the restored time domain information; and
   classifying the input sequence based on the augmented data.
2. The computer-implemented method of clause 1, in which a full input sequence is restored.
3. The computer-implemented method of clause 1 or 2, in which the full input sequence is restored based at least in part on an average sample dropping ratio for the input sequence.
4. The computer-implemented method of any of clauses 1-3, further comprising restoring an order of the input sequence.

The computer-implemented method of any of clauses 1-4, in which the input sequence comprises a sequence of range-Doppler images.
6. The computer-implemented method of any of clauses 1-5, in which the range-Doppler images correspond to one or more hand gestures.
7. The computer-implemented method of any of clauses 1-6, further comprising determining a length of a cycle of the input sequence.
8. The computer-implemented method of any of clauses 1-7, further comprising extracting at least one noise portion from the input sequence.
9. A computer-implemented method, comprising:
   receiving a sequence including one or more motion portions and one or more noise portions;
   extracting features representing the sequence;
   identifying one or more of the noise portions via an artificial neural network (ANN), the ANN trained to identify noise based on the extracted features; and
   removing the identified noise portions of the sequence.
10. The computer-implemented method of clause 9, further comprising: segmenting the sequence into multiple sequence segments; and determining a prediction of whether each sequence segment includes the noise.
11. The computer-implemented method of clause 9 or 10, in which the multiple sequence segments are defined according to a sliding window having a predefined length.
12. The computer-implemented method of any of clauses 9-11, in which the predefined length is proportional to one or more of a continuous duration of a gesture or the sampling rate of the input sequence.
13 The computer-implemented method of any of clauses 9-12, in which for an overlapped portion with adjacent windows with a different prediction, a boundary determination is based on a half portion of the overlapped portion.
14. The computer-implemented method of any of clauses 9-13, in which, for an overlapped portion with adjacent windows with a different prediction, the overlapped portion is identified as noise.
15. An apparatus comprising:
   a memory; and
   at least one processor coupled to the memory, the at least one processor being configured:
   to receive an input sequence;
   to extract a set of features from the input sequence;
   to determine a frequency distribution for the input sequence based on the extracted features;
   to restore time domain information for the input sequence by performing an inverse fast Fourier transformation on the frequency distribution;
   to augment data for the input sequence by decoding the restored time domain information; and
   to classify the input sequence based on the augmented data.
16. The apparatus of clause 15, in which the at least one processor is further configured to restore a full input sequence.

17. The apparatus of clause 15 or 16, in which the at least one processor is further configured to restore a full input sequence based at least in part on an average sample dropping ratio for the input sequence.
18. The apparatus of any of clauses 15-17, in which the at least one processor is further configured to restore an order of the input sequence.
19. The apparatus of any of clauses 15-18, in which the input sequence comprises a sequence of range-Doppler images.
20. The apparatus of any of clauses 15-19, in which the range-Doppler images correspond to one or more hand gestures.
21. The apparatus of any of clauses 15-20, in which the at least one processor is further configured to determine a length of a cycle of the input sequence.
22. The apparatus of any of clauses 15-21, in which the at least one processor is further configured to extract at least one noise portion from the input sequence.
23. An apparatus comprising:
a memory; and
at least one processor coupled to the memory, the at least one processor being configured:
  to receive a sequence including one or more motion portions and one or more noise portions;
  to extract features representing the sequence;
  to identify one or more of the noise portions via an artificial neural network (ANN), the ANN trained to identify noise based on the extracted features; and
  to remove the identified noise portions of the sequence.
24. The apparatus of clause 23, in which the at least one processor is further configured:
to segment the sequence into multiple sequence segments; and
to determine a prediction of whether each sequence segment includes the noise.
25. The apparatus of clause 23 or 24, in which the at least one processor is further configured to define the multiple sequence segments according to a sliding window having a predefined length.
26. The apparatus of any of clauses 23-25, in which the predefined length is proportional to one or more of a continuous duration of a gesture or the sampling rate of the input sequence.
27 The apparatus of any of clauses 23-26, in which the at least one processor is further configured to determine, for an overlapped portion with adjacent windows with a different prediction, a boundary based on a half portion of the overlapped portion.
28. The apparatus of any of clauses 23-27, in which the at least one processor is further configured to identify, for an overlapped portion with adjacent windows with a different prediction, the overlapped portion as noise.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

In one aspect, the receiving means, extracting means, determining means, restoring means, augmenting means, and/or classifying means may be the CPU 102, program memory associated with the CPU 102, the dedicated memory block 118, fully connected layers 362, and/or the sensing chips 404 configured to perform the functions recited. In another configuration, the aforementioned means may be any module or any apparatus configured to perform the functions recited by the aforementioned means.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method comprising:
    receiving an input sequence;
    extracting a set of features from the input sequence;
    determining a frequency distribution for the input sequence based on the extracted features;
    restoring time domain information for the input sequence by performing an inverse fast Fourier transformation on the frequency distribution;
    augmenting data for the input sequence by decoding the restored time domain information; and
    classifying the input sequence based on the augmented data.

2. The computer-implemented method of claim 1, in which a full input sequence is restored.

3. The computer-implemented method of claim 2, in which the full input sequence is restored based at least in part on an average sample dropping ratio for the input sequence.

4. The computer-implemented method of claim 1, further comprising restoring an order of the input sequence.

5. The computer-implemented method of claim 1, in which the input sequence comprises a sequence of range-Doppler images.

6. The computer-implemented method of claim 5, in which the range-Doppler images correspond to one or more hand gestures.

7. The computer-implemented method of claim 1, further comprising determining a length of a cycle of the input sequence.

8. The computer-implemented method of claim 1, further comprising extracting at least one noise portion from the input sequence.

* * * * *